July 16, 1963  E. E. SALOUM  3,097,867
COUPLING

Filed April 13, 1961  2 Sheets-Sheet 1

INVENTOR.
EDWARD E. SALOUM
BY
Woodling, Krost, Granger & Rust
ATTORNEYS

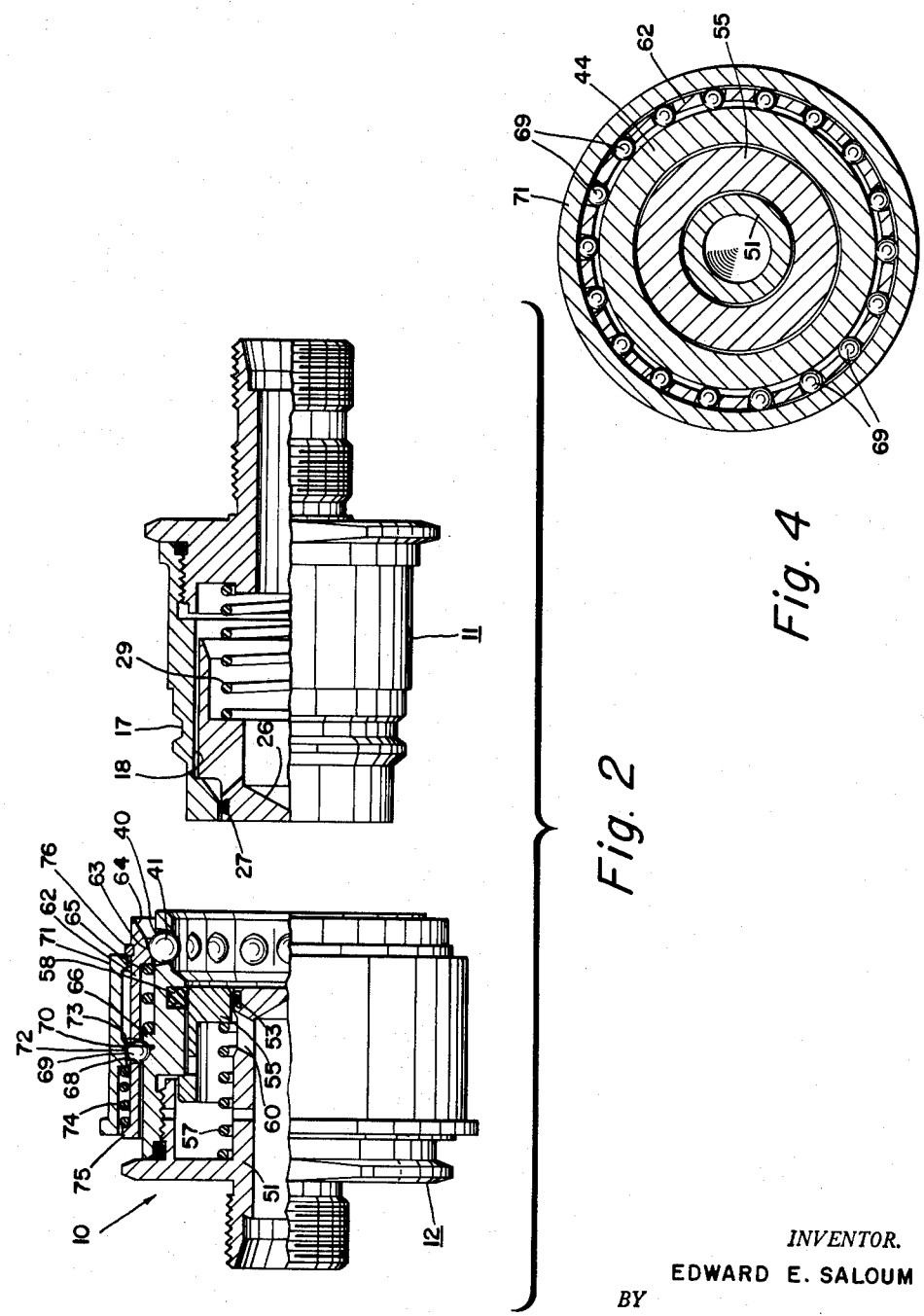

United States Patent Office 3,097,867
Patented July 16, 1963

3,097,867
COUPLING
Edward E. Saloum, Corry, Pa., assignor to Snap-Tite, Inc., a corporation of Pennsylvania
Filed Apr. 13, 1961, Ser. No. 102,731
3 Claims. (Cl. 285—86)

The present invention relates in general to couplings wherein male and female units are held together by interlocking detent means and more particularly to such couplings wherein a much smaller force is required to disconnect the male and female units when high internal pressures are being carried by the units.

An object of the present invention is to provide a coupling which can be designed so as to separate the male and female units with a force set between predetermined limits.

Another object of the present invention is to provide a coupling which utilizes detents between a male and female unit to hold the same together and held in position by a primary locking sleeve with secondary detents and a secondary locking sleeve which control the primary locking sleeve.

Another object of the present invention is to provide a coupling which can be easily opened even when handling fluids under high pressure.

Another object of the present invention is to provide a coupling which includes first and second coupling members which are held in coupled relationship by the use of primary and secondary detents and primary and secondary locking sleeves.

Another object of the present invention is to provide a coupling which includes male and female members held together by means of primary detents engaged by an inclined surface on a locking sleeve which gives an axial horizontal component of force on the locking sleeve with fluid under pressure in the coupling and with the locking sleeve being restrained from movement by means of another locking sleeve and secondary detents.

Other objects and a fuller understanding of this invention may be had by referring to the following description and claims, taken in conjunction with the accompanying drawings, in which:

FIGURE 2 is a side elevational view of the coupling shown in FIGURE 1 but showing the male and female units uncoupled;

FIGURE 4 is a view taken generally along the lines 4—4 of FIGURE 1.

Figure 1:
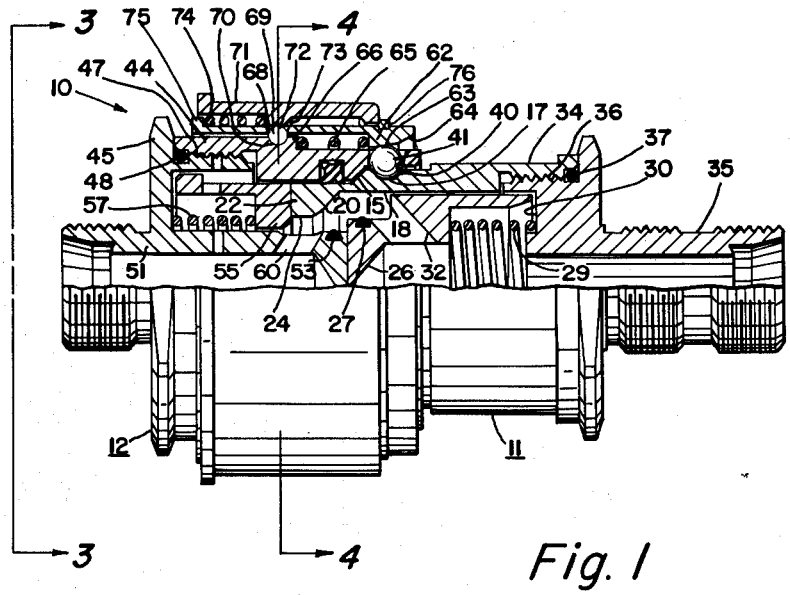
FIGURE 1 is a side elevational view partially in section of the coupling of the present invention.
Figure 3:
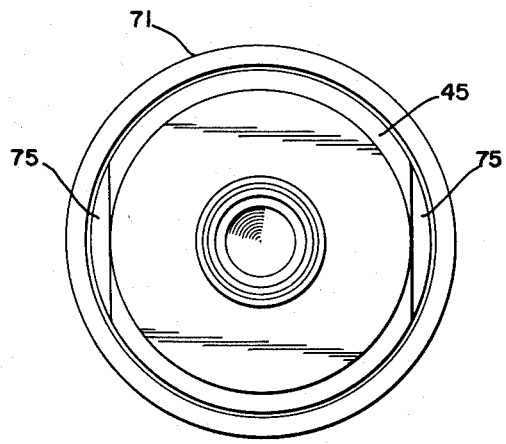
FIGURE 3 is a view taken generally along the lines 3—3 of FIGURE 1.

The coupling of the present invention has been indicated generally by the reference numeral 10 and as will be noted includes a male unit 11 and a female unit 12. The female unit is provided with a bore 15 which is for the purpose of receiving the male unit 11. The male unit is provided with an annular locking groove or locking surface or groove means 17 on the outer surface thereof and as will be noted the locking groove is provided with outwardly flared sidewalls. Wall means 18 define an axial bore through the male unit 11 and these wall means are on a taper 20 at the nose end portion 22 of the male unit. This construction defines a first or male valve seat 24. A first or male valve member 26 is slidingly positioned in the axial bore of the male unit 11 and is provided with a resilient sealing member 27 which resides in a groove thereon and which is adapted to seal against the valve seat 24 in the closed position of the valve (FIGURE 2). A spring 29 is located in the axial bore of the male unit 11 and engages the valve member 26 at one end thereof and engages an abutment 30 on the male unit 11 at another end thereof to constantly urge the valve member 26 to the closed position shown in FIGURE 2. Wall means 32 are provided in the male valve member 26 to define a plurality of ports through the male valve member to permit the flow of fluids through the male unit when the valve member is in an open position (FIGURE 1). In the embodiment shown in the accompanying drawings, there are four ports 32 through the male valve member 26. The male unit 11 which is shown in FIGURES 1 and 2 is comprised of first and second parts 34 and 35 secured together by threads 36 with a sealing ring 37 positioned between the two members to provide a fluid tight connection.

The female unit 12 is provided with a plurality of circumferentially spaced sockets or retaining means 40 each of which is provided with outwardly flared sidewalls. The diameter of the inner portion of the socket is less than the diameter of locking balls or detents 41 held thereby so that the locking balls are prevented from falling into the bore of the female unit, however, the locking balls can be moved outwardly. The drawings do not illustrate the number of sockets 40 and locking balls 41 in this particular embodiment, however, it may be said that in this embodiment 12 or 16 of each may be provided and they are spaced substantially 30 or 22½ degrees apart. The first group of locking balls or detents 41 located in the sockets 40 normally project into the bore 15 of the female unit 12 and into the locking groove 17 when the hose end 22 of the male unit 11 is inserted into the bore 15 and this serves to lock the male and female units in coupled condition. The female unit in a manner similar to the male unit is comprised of first and second parts 44 and 45 respectively which are secured together by means of threads 47 and a sealing ring 48 serves to insure a fluid tight connection between the two parts. The first part 44 of the female unit is the part which carries the sockets 40 and the locking balls 41.

The second part 45 of the female unit is provided with an axial tubular extension 51 which terminates short of the extreme mouth of the female unit. A resilient sealing member 53 resides in a groove on the outer surface of the tubular extension 51 and serves as a second or female valve seat. A second or female valve member 55 slidably resides on the axial tubular extension 51 and is constantly urged to a closed condition (FIGURE 2) by means of a spring 57, one end of which engages the valve member 55 and the other end of which engages the female unit. Wall means 60 define a plurality of ports through the axial tubular extension 51 (specifically 4 in number) to permit flow of fluid through the female unit when the valve member 55 is in an open condition as is shown in FIGURE 1. In the coupled condition of the male and female units as shown in FIGURE 1, the tubular extension 51 engages the male valve member 26 and opens the same against the urging of the spring 29. A sealing member 58 is provided to make a seal between the female valve member 55 and the bore 15 of the female unit. At the same time the nose end 22 of the male unit engages and opens the female valve member 55 and in this manner fluid can be passed directly through the male and female units.

A primary locking sleeve 62 surrounds and slides on the first part 44 of the female unit and is provided with primary and secondary inclined surfaces 63 and 64 respectively for engagement with the locking balls 41. The primary and secondary inclined surfaces may also be referred to as first and second inclined surfaces. In the position shown in FIGURES 1 and 2 the primary inclined surface 63 is in engagement with the locking balls 41. For the sake of example this surface is on the order of 15 degrees. A spring 65 is located in a chamber formed between the primary locking sleeve 62 and the first part 44 of the female unit and engages the primary locking sleeve at one end and a shoulder 66 on the female unit at another end to constantly urge the primary locking sleeve 62 to a locked position (FIGURE 1) whereat the primary inclined surface engages the locking balls to hold the locking balls in the groove 17.

The primary locking sleeve 62 is itself provided with a plurality of circumferentially spaced sockets or secondary retaining means 68 which are provided with outwardly flared sidewalls. The construction of the socket 68 is similar to the sockets 40 in the sense that the inner diameter of the socket is less than the diameter of secondary locking balls or detents 69 which are located therein. This prevents the secondary locking balls 69 from moving radially inwardly more than a predetermined distance. An annular locking surface or locking surface means 70 is provided in the outer surface of the first part 44 of the female unit and the secondary locking balls 69 normally reside in the locking surface 70. A secondary locking sleeve 71 surrounds and is slidable on the primary locking sleeve 62 and has primary and secondary inclined surfaces 72 and 73 respectively for engagement with the secondary locking balls. The primary and secondary inclined surfaces 72 and 73 may also be referred to as first and second inclined surfaces. The first inclined surface 72 is the surface which is in engagement with the secondary locking balls 69 in FIGURES 1 and 2 and is at a smaller angle than the secondary inclined surface 73 and normally engages the secondary locking balls. For the sake of example the primary inclined surface 72 is at an angle of approximately 5 degrees. The surface may however be flat or parallel with the coupling axis. A spring 74 resides in a chamber which is formed between the secondary and primary locking sleeves and engages the secondary locking sleeve 71 at one end and a shoulder 75 on the primary locking sleeve at another end to constantly urge the secondary locking sleeve to a locked position whereat the primary inclined surface 72 engages the secondary locking balls 69 to hold them in the annular locking surface 70. A snap ring 76 serves to prevent the secondary locking sleeve from traveling to the right as shown in FIGURES 1 and 2 and off of the primary locking sleeve. The locking balls 41 prevent the primary locking sleeve from traveling to the right and off of the first part 44 of the female unit. The secondary sleeve and detent and locking surface may also be referred to as secondary detent and locking sleeve means.

The coupling which has been shown and described herein and is mentioned in the objects performs the function of enabling the male and female units to be disconnected with much less effort than is required in conventional designs when the units are handling fluid flow under a high pressure. With a fluid under a high pressure in the units there is a large force tending to move the male and female units axially apart. This force is transmitted through the locking balls or detents 41 to the primary inclined surface 63 which is normally in engagement with the locking balls 41. There is therefore a component of force acting radially on the primary locking sleeve and axially on the locking sleeve and in the absence of the secondary locking sleeve and locking balls the primary locking sleeve would unlock, permitting the male and female units to separate. As a result the surface on the primary locking sleeve which is normally in contact with the locking balls is normally made flat or in other words parallel with the axis of the coupling. This means therefore that the force of the fluid pressure which is tending to uncouple the male and female units and which is transmitted through the locking balls 41 is acting in a radial direction against the primary locking sleeve with no horizontal component of force which does not move the locking sleeve to unlocked condition. The force however between the locking balls 41 and the surface on the primary locking sleeve is so great under high fluid pressure that it is extremely difficult to move the primary locking sleeve to unlocked condition.

With the design which is shown and described herein, however, and with the use of the primary inclined surface 63, the axial component of force acting upon the primary locking sleeve can be and is counter-balanced by the use of the secondary locking sleeve and locking balls. As will be noted the force acting upon the secondary locking balls 69 acts only slightly above the center of the secondary locking balls and as a result there is only a very slight radial component of force acting on the secondary locking sleeve and only a slight axial force tending to move the secondary locking sleeve to unlocked condition. This can very easily be controlled by those skilled in the art that by regulating the angle of the primary inclined surface 63 on the primary locking sleeve and the angle of the primary inclined surface 72 on the secondary locking sleeve and the force of springs 65 and 74, that the force required to disconnect the male and female units at any given internal fluid pressure can be set within limits, at any reasonable magnitude. For the sake of example with the use of the coupling shown in the drawings and described, while operating under 3,000 pounds per square inch hydraulic fluid pressure, the disconnecting force can be set at 30 pounds minimum force and 50 pounds maximum force. It will therefore be seen that the problem of coupling and uncoupling the male and female units which are used in handling fluids under a high pressure has been solved to a great degree. The problem in a large measure has been greatly solved with the use of the secondary locking sleeve and locking detents in combination with the primary locking sleeve and locking detents. It will also be seen that the other objects mentioned hereinabove have also been carried out through the present design.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A coupling for conducting fluid under pressure comprising male and female members, said female member having a bore for the reception of said male member, said male member having an annular locking groove on the outer surface thereof, said female member having circumferentially spaced sockets, balls in said sockets projectable into said locking groove when said male member is inserted into said female member bore to lock said members in coupled condition, a primary locking sleeve surrounding and axially slidable on the outer surface of said female member and having an inclined surface for engagement with said balls whereby the fluid pressure in said coupling acts between said balls and said inclined surface exerting an axial component of force on said primary locking sleeve tending to unlock the same, spring means to constantly urge said primary locking sleeve to a locked position, said primary locking sleeve having circumferentially spaced sockets, said female member having a secondary annular locking groove on the outer surface thereof, secondary balls in said primary locking sleeve sockets normally residing in said secondary locking groove, a secondary locking sleeve surrounding and axially slidable on said primary locking sleeve and having a surface for engagement with said secondary balls to lock said primary locking sleeve in a locked position on the outer surface of said female member, spring means to constantly urge said secondary locking sleeve to the locked position whereat said surface thereof engages said secondary balls to hold same in said secondary annular locking groove which prevents axial movement of said primary locking sleeve on the outer sleeve of said female member and removal of said balls from said locking groove and separation of said male and female members.

2. A coupling for conducting fluid under pressure comprising male and female members, said female member having a bore for the reception of said male member, said male member having a first locking recess on the outer surface thereof, said female member having first socket means, detents in said first socket means projectable into said locking recess when said male member is inserted into said female member bore to lock said members in coupled condition, a primary locking sleeve axially slidable on the outer surface of said female member and having inclined surface means for engagement with said detents whereby fluid pressure in said coupling acts between said detents and said inclined surface means exerting an axial component of force on said primary locking sleeve tending to unlock the same, spring means urging said primary locking sleeve to a locked position, said primary locking sleeve having second socket means, said female member having a secondary locking recess on the outer surface thereof, secondary detents in said primary locking sleeve, second socket means normally residing in said secondary locking recess, a secondary locking sleeve axially slidable on said primary locking sleeve and having a surface for engagement with said secondary detents to lock said primary locking sleeve in a locked position on the outer surface of said female member, spring means urging said secondary locking sleeve to a locked position whereat said surface thereof engages said secondary detents to hold same in said secondary locking recess which prevents axial movement of said primary locking sleeve on the outer surface of said female member and removal of said detents from said first locking recess and separation of said male and female members.

3. A coupling for conducting fluid under pressure comprising male and female members, said female member having a bore for the reception of said male member, said male member having a first locking recess thereon, said female member having first socket means, detents in said first socket means projectable into said first locking recess when said male member is inserted into said female member bore to lock said members in coupled condition, a primary locking sleeve slidable on said female member and having tapered surface means for engagement with said detents whereby the fluid pressure in said coupling acts between said detents and said tapered surface means exerting a component of force on said primary locking sleeve tending to unlock the same, biasing means to urge said primary locking sleeve to a locked position, said primary locking sleeve having second socket means, said female member having a secondary locking recess thereon, secondary detents in said primary locking sleeve, second socket means normally residing in said secondary locking recess, a secondary locking sleeve slidable on said primary locking sleeve and having a surface for engagement with said secondary detents to lock said primary locking sleeve in a locked position on said female member, biasing means to urge said secondary locking sleeve to a locked position whereat said surface thereof engages said secondary detents to hold same in said secondary locking recess which prevents movement of said primary locking sleeve on said female member and removal of said detents from said first locking recess and separation of said male and female members.

References Cited in the file of this patent

UNITED STATES PATENTS

| | | |
|---|---|---|
| 2,457,251 | Main | Dec. 28, 1948 |
| 2,545,796 | Scheiwer | Mar. 20, 1951 |
| 2,747,938 | Scheiwer | May 29, 1956 |
| 2,860,893 | Clark | Nov. 18, 1958 |